Patented Sept. 15, 1953

2,652,314

UNITED STATES PATENT OFFICE 2,652,314

METHOD OF PRESERVING AND PRESENTING A URINE SAMPLE FOR ANALYSIS THEREOF

Norman W. Drey, University City, Mo.

No Drawing. Application March 10, 1949,
Serial No. 80,762

5 Claims. (Cl. 23—230)

This invention relates to certain new and useful improvements in methods of chemical analysis of biologic and inorganic material.

In the everyday practice of medicine there is a constant need to analyze biologic materials for diagnostic and therapeutic purposes. Such analyses vary from routine determination of urine sugar, urine albumin, blood sugar, and the like to serological tests for determining the presence of pathological and immunological bodies. In the industrial field, as well, there is the constant necessity of analyzing various chemical agents, such as may be used in electroplating and electroetching in order to maintain the requisite strength thereof.

Thus, the primary object of the present invention is to provide a method for analyzing biologic and inorganic material in which minute quantities of the material may be effectively used.

A further object of the present invention is to provide a method for the purpose stated which involves preserving the material to be analyzed by absorbent means until tested.

It is an additional object of the present invention to provide a method for the purpose stated which coordinates with standard analytical procedures.

The method of the present invention comprises the depositing of a measured quantity of the material to be tested upon an absorbent body. The specimen may be deposited upon the absorbent body while said body is encased within a suitable container or outer housing which may then be closed for purposes of transmittal to a laboratory or for storage. The container is preferably flexible, impervious, and light weight, as fully described and set forth in my co-pending application, Serial No. 80,761, filed March 10, 1949. At a laboratory the absorbent body is placed in a suitable analytical flask or vessel for digestion or extraction in accordance with conventional laboratory procedure. The resultant solution or extract may then be subjected to any standard scheme of chemical analysis required to ascertain some selected or particular chemical, biological or serological characteristic of the material. For most biological work it is preferable that the absorbent body be impregnated first with a preservative in order to protect the specimen absorbed thereon from deterioration during transmittal and long periods of storage.

Hereunder are set forth various examples illustrative of the wide applicability of the method herein disclosed.

*Biochemical determination tests*

For the analysis of urine for sugar content, any suitable absorbent material, such as filter paper, woven glass cloth, alpha cellulose wadding, fibre glass having a phenolic resin binder, and the like is provided and is treated with any suitable preservative agent, such as 2½ to 4 percent solution of sodium fluoride (NaF), or mercuric chloride, merthiolate, or any other organic mercurial. Eight (8) to ten (10) drops, which is equivalent broadly to one-half (½) cc., of the urine specimen is deposited upon the absorbent body. The urine as thus contained by the absorbent is inert under all atmospheric conditions and may be kept for indefinite periods of time without danger of deterioration through enzymatic or bacterial action. Any accumulation of dirt, soot, and the like upon the absorbed specimen will not interfere with accurate analysis. The absorbent body is then placed in a suitable laboratory vessel and the specimen therein contained may be analyzed by any standard procedure, such as Somogyi's method wherein the absorbent is treated with and the urine specimen is desorbed or extracted in a five (5) cc. of 10 per cent sodium carbonate ($Na_2CO_3$) solution, which will give, if sugar is present, the usual color reaction with the intensity thereof determinative of the quantity of sugar. Other standardized tests may also be used such as treatment with Fehling's solution, Benedict's solution, or other alkaline copper reagents. As an example of these tests, five (5) cc. of Benedict's solution is poured on the specimen-containing absorbent body which is then permitted to soak at room temperature for extracting the specimen. The extract solution is then poured into a suitable container and heated to give the normal color reaction. The results of tests so conducted compared precisely with those obtained from controlled tests wherein the urine was collected in substantial quantity in the commonly used containers and tested directly therefrom.

Urine specimens collected in the manner above stated may also be as readily used for determination of albumin by the standard or so-called heat-coagulation test. The urine is extracted or desorbed from the absorbent body at room temperature by treating the absorbent body with five (5) cc. of a weak solution, in the order of 1 per cent, of sodium hydroxide (NaOH). The urine-containing solution is then poured off and filtered. The filtrate is then acidified with 3 per cent acetic acid, and heated until near boiling which is slightly above 70° C., to give the usual turbidity reaction from which the amount of albumin present may be determined.

In blood sugar analysis one-tenth (1/10) cc. of blood is deposited upon the absorbent body which has been impregnated with a suitable preservative. The blood specimen so absorbed is inert under all atmospheric conditions for indefinite periods of time and the testing thereof will not be affected by any accumulations of dirt, soot, and the like. The blood-containing absorbent body is placed in a laboratory vessel and treated with standard sodium hydroxide (NaOH) or barium hydroxide (BaOH) solution in measured amount for extraction or desorption of the blood therefrom. When the extraction is complete, as may be determined by removal of all trace of the blood from the absorbent body, the blood-containing solution is treated with a measured quantity of zinc sulphate (ZnSO4) to provide a precipitation which is filtered off. The filtrate is ready to be quantitatively tested for sugar by any standard procedure such as Somogyi's micro method. It is to be particularly noted that the precise amounts of the measured quantities of hydroxide solution and zinc sulphate as utilized in this analysis are determined by normal clinical methods.

Serological tests

Blood absorbed by a preservative-impregnated absorbent body may also be analyzed for determination of pathological and immunological bodies. For such tests blood in the quantity of one or two ml. is deposited upon the absorbent body. The amount of blood used is dependent upon the amount of absorbent as it has been determined that filter paper of 90 mm. diameter, properly folded and a mass of glass wool weighing .1 gram will absorb 1 ml. of blood. Blood so contained will keep for extended periods of time without any danger of deterioration. The blood-containing absorbent body is then placed in a suitable laboratory vessel and treated with a quantity of .85 per cent salt solution equal to the amount of blood collected for extracting or desorbing the blood specimen. The extract solution is then poured off and centrifuged in order to obtain clear sera-containing solution by removing the red cells and any particles, such as fibres, of the absorbent body. This sera-containing solution may then be tested by any standardized method for determining the presence therein of pathological or immunological bodies, such as, by way of example, for diagnosis of syphilitic infection by the precipitation method of Kahn, the newly developed VDRL slide agglutination test (the letters VDRL refer to Venereal Disease Research Laboratory), or the complement fixation test of Kolmer. The qualitative and quantitative results of tests using the sera-containing solution corresponded precisely with the results of the same tests which used undiluted blood promptly after collection. Standard agglutination tests as used in the diagnosis of typhoid fever, undulant fever, and the like, as well as pregnancy determination tests are further examples of procedures which may be successfully performed with the sera-containing solution.

Inorganic quantitative tests

In the field of inorganic chemistry the method herein disclosed has great applicability. In tests of this character it is not requisite that the absorbent body be treated with a preservative agent. The analysis of iron in a solution of iron chloride, as is frequently used in an etching bath for copper halftones, will serve to illustrate this application of the present method. One (1) ml. of the iron chloride solution is deposited on the absorbent body. The sample so absorbed will maintain its peculiar strength regardless of the duration of the time intervening between collection and analysis. The absorbent body is then placed in a suitable laboratory vessel and treated with 45 ml. of water and 5 ml. of hydrochloric acid (HCl) for extraction or desorption of the iron chloride. This extract-containing solution is then brought to a boil in which state it may be tested for total iron by standard procedures, such as the commonly used Zimmerman-Reinhardt method. The results obtained from such tests have a maximum variation of less than 2 per cent from results of tests performed directly with iron chloride solution. From the foregoing, it is evident that it is within the scope of any laboratory technician to adapt the above set forth procedure for extracting specimens of other inorganic materials deposited upon the absorbent body for quantitative testing thereof, such as for nickel, chromium, and copper as used in plating solutions, as for silver in silver nitrate solutions, and as for magnesium or calcium in water.

Any specimen to be tested whether biologic or inorganic in character may be deposited upon the absorbent body while said body is in a suitable impervious flexible container which container is then closed and transmitted or stored, the specimen being still in a moist state. Thus the present method provides economical means for transmitting minute quantities of specimen material which may be effectively analyzed by any standard chemical analytical procedure.

It should be understood that changes in the methods, compositions, percentages, and combinations set forth may be made without departing from the nature and principle of my invention.

Having thus described my invention what I now claim and desire to secure by Letters Patent is:

1. The method of collecting, preserving, and presenting for ultimate analysis a urine specimen for determination of sugar content thereof, which comprises providing a section of absorbent material, impregnating said absorbent material with an agent for inhibiting the decomposition by enzymatic or bacterial action of sugar contained in urine collected on said absorbent material, depositing a quantity of a liquid urine specimen on said material under atmospheric conditions, preserving the thus treated absorbent material for any selected period of time under atmospheric conditions, and ultimately subjecting the thus treated absorbent material to the indicated reagent for determining the sugar present in the absorbed specimen.

2. The method of collecting, preserving, and presenting for ultimate analysis a urine specimen for determination of sugar content thereof, which comprises providing a section of absorbent material, impregnating said absorbent material with a bacteriostatic agent for preventing chemical decomposition by bacteria of sugar contained in urine collected on said absorbent material, depositing a quantity of a liquid urine specimen on said material under atmospheric conditions, preserving the thus treated absorbent material for any selected period of time under atmospheric conditions, ultimately extracting the urine specimen from the absorbent material in a quantity of a compatible liquid agent, and subjecting the extract solution to the indicated treatment for determining the sugar present in the specimen.

3. The method of collecting, preserving, and presenting for ultimate analysis a urine specimen for determination of sugar content thereof, which comprises providing a section of absorbent material, impregnating said absorbent material with a preservative agent for stabilizing as to its original characteristics urine collected on said absorbent material, depositing a quantity of a liquid urine specimen on said material under atmospheric conditions, preserving the thus treated absorbent material for any selected period of time under atmospheric conditions, and subjecting the thus treated absorbent material to a ten percent solution of sodium carbonate for reaction with the absorbed specimen to produce a coloration determinative of the quantity of sugar present in the specimen.

4. The method of collecting, preserving, and presenting for ultimate analysis a urine specimen for determination of sugar content thereof, which comprises providing a section of absorbent material, impregnating said absorbent material with a preservative agent for stabilizing as to its original characteristics urine collected on said absorbent material, depositing a quantity of a liquid urine specimen on said material under atmospheric conditions, preserving the thus treated absorbent material for any selected period of time under atmospheric conditions, ultimately soaking the thus treated absorbent material in an alkaline copper reagent for extraction of the specimen from the absorbent material, and then heating the extract solution for production of a color reaction varying directly in intensity to the amount of sugar present in the specimen.

5. The method of collecting, preserving, and presenting for ultimate analysis a urine specimen for determination of sugar content thereof, which comprises providing a section of absorbent cellulosic material, impregnating said absorbent material with sodium fluoride for stabilizing as to its original characteristics urine collected on said absorbent material, depositing a quantity of a liquid urine specimen on said material under atmospheric conditions, preserving the thus treated absorbent material for any selected period of time under atmospheric conditions, and ultimately subjecting the thus treated absorbent material to the indicated reagent for determining the sugar present in the absorbed specimen.

NORMAN W. DREY.

References Cited in the file of this patent

UNITED STATES PATENTS

| Number | Name | Date |
|---|---|---|
| 660,972 | Ryan | Oct. 30, 1900 |
| 743,394 | Mitchell | Nov. 3, 1903 |
| 1,343,579 | Palmer | June 15, 1920 |
| 2,194,131 | Terry | Mar. 19, 1940 |

FOREIGN PATENTS

| Number | Country | Date |
|---|---|---|
| 406,850 | Great Britain | Mar. 8, 1934 |

OTHER REFERENCES

Indicators and Test Papers, Cohn, John Wiley and Son, N. Y., 1899, page 214.

Clinical Diagnosis by Laboratory Methods, 9th ed., Todd and Sanford, W. B. Saunders Co., Philadelphia, Pa., (1941), pages 607–9.